(12) United States Patent
Pohl

(10) Patent No.: US 6,441,709 B2
(45) Date of Patent: Aug. 27, 2002

(54) DEVICE FOR SHORT-CIRCUIT PROTECTION

(75) Inventor: Fritz Pohl, Hemhofen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/772,816

(22) Filed: Jan. 30, 2001

Related U.S. Application Data

(63) Continuation of application No. PCT/DE99/02228, filed on Jul. 19, 1999.

(30) Foreign Application Priority Data

Jul. 30, 1998 (DE) .......................... 198 34 474

(51) Int. Cl.⁷ .............................................. H01H 83/00
(52) U.S. Cl. ..................... 335/195; 335/16; 335/147; 218/22
(58) Field of Search .................... 335/16, 147, 195; 218/2–7, 14, 16–21, 78, 84, 154

(56) References Cited

U.S. PATENT DOCUMENTS 3,562,459 A * 2/1971 Bould .......................... 218/14
5,162,765 A * 11/1992 Divincenzo et al. ........ 335/175
5,689,397 A    11/1997 Pohl et al.

FOREIGN PATENT DOCUMENTS

| DE | 3342469 A1 | 6/1985 |
| DE | 9216335.1  | 3/1993 |
| DE | 4040359 C2 | 1/1994 |
| DE | 4309794 A1 | 9/1994 |
| DE | 4110335 C2 | 7/1995 |
| EP | 0691046 B1 | 1/1996 |

* cited by examiner

Primary Examiner—Lincoln Donovan
(74) Attorney, Agent, or Firm—Laurence A. Greenberg; Werner H. Stemer; Ralph E. Locher

(57) ABSTRACT

The current-limiting mechanism is provided in particular in order to protect electromechanical contactors from being welded by a short-circuit load. In a first step, the current-limiting mechanism closes a bridging contact of a first bridging current path in order to reduce the current load on the contactor. In a second step, its bridging function is taken over by a switching arc and by a second bridging current path, In the further course of the disconnection process, the switching arc commutates from the bridging contact onto associated running rails or arc runners and runs into an arcing chamber of the current-limiting mechanism. As a result, the short-circuit is interrupted.

14 Claims, 3 Drawing Sheets

DEVICE FOR SHORT-CIRCUIT PROTECTION

CROSS-REFERENCE TO RELATED APPLICATION

This application is a continuation of International Application No. PCT/DE99/02228, filed Jul. 19, 1999, which designated the United States.

BACKGROUND OF THE INVENTION

1. Field of the Invention

The invention relates to a device for short-circuit protection of an electromechanical contactor, in particular in order to protect the contacts of the contactor from being welded by a short-circuit load, with a current-limiting mechanism. The current-limiting mechanism is connected in series with the contactor and comprises a contact configuration having a fixed contact and a moving contact as well as an arcing chamber associated with them.

A current-limiting mechanism for carrying the current at least at times is known from German patents DE 40 40 359 C2 and DE 41 10 335 C2. Furthermore, a configuration for disconnecting branches of a low-voltage cable network in the event of a short-circuit is known from European patent EP 0 691 046 B1. There, loads are connected to phase conductors and to an associated neutral conductor in the branch, a switching element for switching on and/or off is connected upstream of the load or loads, and additional switching elements for short-circuit disconnection are provided in the phase conductor and/or neutral conductor. A bridging circuit with switches is connected to the switching elements, and a single circuit breaker is provided only in the phase conductor. In this case, the bridging circuit on the load side of the single circuit breaker carries a portion of the short-circuit current past the switch, with the bridging circuit containing a bridging current path with a resistance whose resistance value is between 25 and 50% of the value of the smallest load circuit impedance which can be expected, and via which the magnetically driven switch in the bridging circuit is connected to the neutral conductor. Such a configuration is designed for specific short-circuit protection requirements.

Electromechanical contactors are used for frequent switching of operational currents. Since contactor magnetic drives react to switching-on and switching-off commands with a time delay of 10 to 20 ms, contactors are not suitable for providing protection devices, which act quickly with them, for example in the event of a short-circuit. Thus, in order to limit damaging effects of short-circuits, contactors are electrically connected in series with a circuit breaker or with fuses. Depending on their short-circuit response, an approved combination of a contactor and circuit breaker or contactor and fuse (in accordance with IEC 947-4) is subdivided into coordination type 1, 2 or 3.

With coordination type 1, the contactor must be unusable after a short-circuit, without any danger originating from it. In coordination type 2, slight contact welding, which can be broken open by using a screwdriver, may be present, so that the switching function can be reproduced with little effort. In coordination type 3, there must be no adverse effect on operation of the contactor whatsoever.

The aim of switchgear manufacturers is to provide coordination type 2 or 3 for contactor applications. Contact materials which have particular resistance to welding, such as $AgSnO_2$, are selected for this purpose, and the current which is passed in the event of a short-circuit is limited to sufficiently low values by matching of the switch-contactor or fuse-contactor equipment combination.

The latter measure has the undesirable consequence that the contactors cannot be used in accordance with their rated-current specification and that the operating currents of the equipment combination must be reduced to half the contactor rated operating current, or even less.

Switch-contactor equipment combinations of coordination type 3 (no limitation to operation) are nowadays offered for relatively small sizes (for example $I_n$=A) as a complete unit (manufacturer's designation integral contactor). The bridge contacts of the contactor are in this case positively opened by a magnetic release in the event of a short-circuit and, at the same time, the short-circuit current is limited to safe values by a switching mechanism which limits powerful currents.

However, this method cannot be directly transferred to contactors with relatively high rated currents (100–400 A). It, furthermore, would necessitate considerable modification of the basic design of the contactor.

SUMMARY OF THE INVENTION

The object of the present invention is to provide an optimized current-limiting device for present-day contactors which overcomes the above-noted deficiencies and disadvantages of the prior art devices and methods of this general kind, and which allows the optimization without the implementation of structural and design measures. In particular, the novel specification is intended to allow operation for coordination type 3, as mentioned above, without any limit to the rated operating current.

With the above and other objects in view there is provided, in accordance with the invention, a device for short-circuit protection of an electromechanical contactor, in particular for protecting the contacts of the contactor from being welded by a short-circuit load. The device comprises:

a current-limiting mechanism connected in series with an electromechanical contactor, the current-limiting mechanism comprising a contact configuration having a fixed contact, a movable contact, and an arcing chamber associated therewith;

the current limiting mechanism defining a first bridging circuit with a bridging contact, a second bridging circuit, and arc runners or running rails;

the current-limiting mechanism being configured to first close the bridging contact of the first bridging circuit for reducing a current load on the contactor, and to then establish a bridging function with a switching arc and via the second bridging circuit, whereby, in a further course of a disconnection process, the switching arc commutates from the bridging contact onto the arc runners and runs into the arcing chamber, for interrupting the short-circuit.

In other words, the short-circuit protection is provided by a current-limiting mechanism of a type which, in a first stage, closes the bridging contact of a bridging current path in order to reduce the current load on the contactor and whose bridging function, in a second stage, is taken over by the switching arc which, in the further course of the disconnection process, runs into an arcing chamber and in the process interrupts the short-circuit.

In accordance with an added feature of the invention, the bridging contact includes an electrically conductive striker pin (which acts on the movable contact) of a magnetic release and a consumable element of a support carrying the movable contact.

In accordance with an additional feature of the invention, the contactor is connected to associated connecting terminals electrically connected in parallel with the bridging circuits.

In accordance with another feature of the invention, the current-limiting mechanism has main contacts electrically connected in parallel with the bridging circuits, and electrically connected in series with the contactor which is connected to the associated connecting terminals.

In accordance with a further feature of the invention, the short-circuit current is conducted through a magnet coil of the magnetic release until a time at which the bridging contact closes.

In accordance with again a further feature of the invention, closing times of between 1 and 2 ms are achievable by the assembly.

In accordance with again an added feature of the invention, once contact has been made by the bridging contact, the movable contact and the fixed contact of a main current path of the current-limiting mechanism are disconnected, and the short-circuit current commutates onto a current path defined by the first bridging circuit.

In accordance with again an additional feature of the invention, a release magnet armature is configured to trip after commutation of the short-circuit current.

In accordance with again another feature of the invention, the current-limiting mechanism is configured to allow the arc to commutate from the bridging contact onto the fixed contact guide rail when the short-circuit current commutates from the first bridging current path onto the second bridging current path.

In accordance with yet an added feature of the invention, the first bridging current path through the bridging contact carries electric current only during short-circuit disconnection.

In accordance with a concomitant feature of the invention, a current-monitoring device is connected in the first bridging circuit for tripping the current-limiting device if an electric current of a predetermined magnitude and time duration is exceeded. In a preferred embodiment, the current-monitoring device is an electro-thermal bimetallic release.

In other words, the bridging contact is advantageously formed by the magnetic release, which acts on the movable contact, at the striking point. The short-circuit current flows through the magnet coil of the magnetic release until the time at which the bridging contact closes, which allows closing times of between 1 and 2 ms to be achieved. Immediately after the bridging contact makes contact, the movable contact and the fixed contact of the main current path are disconnected as a result of the opening impact, and the short-circuit current commutates onto the bridging current path with a corresponding reduction in the current flowed on the contactor and on the release coil. The latter leads to the tripping of the release magnet armature, thus resulting in the arc commutating, if this has not already happened, from the bridging contact onto the fixed contact guide rail.

Other features which are considered as characteristic for the invention are set forth in the appended claims.

Although the invention is illustrated and described herein as embodied in a device for short-circuit protection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
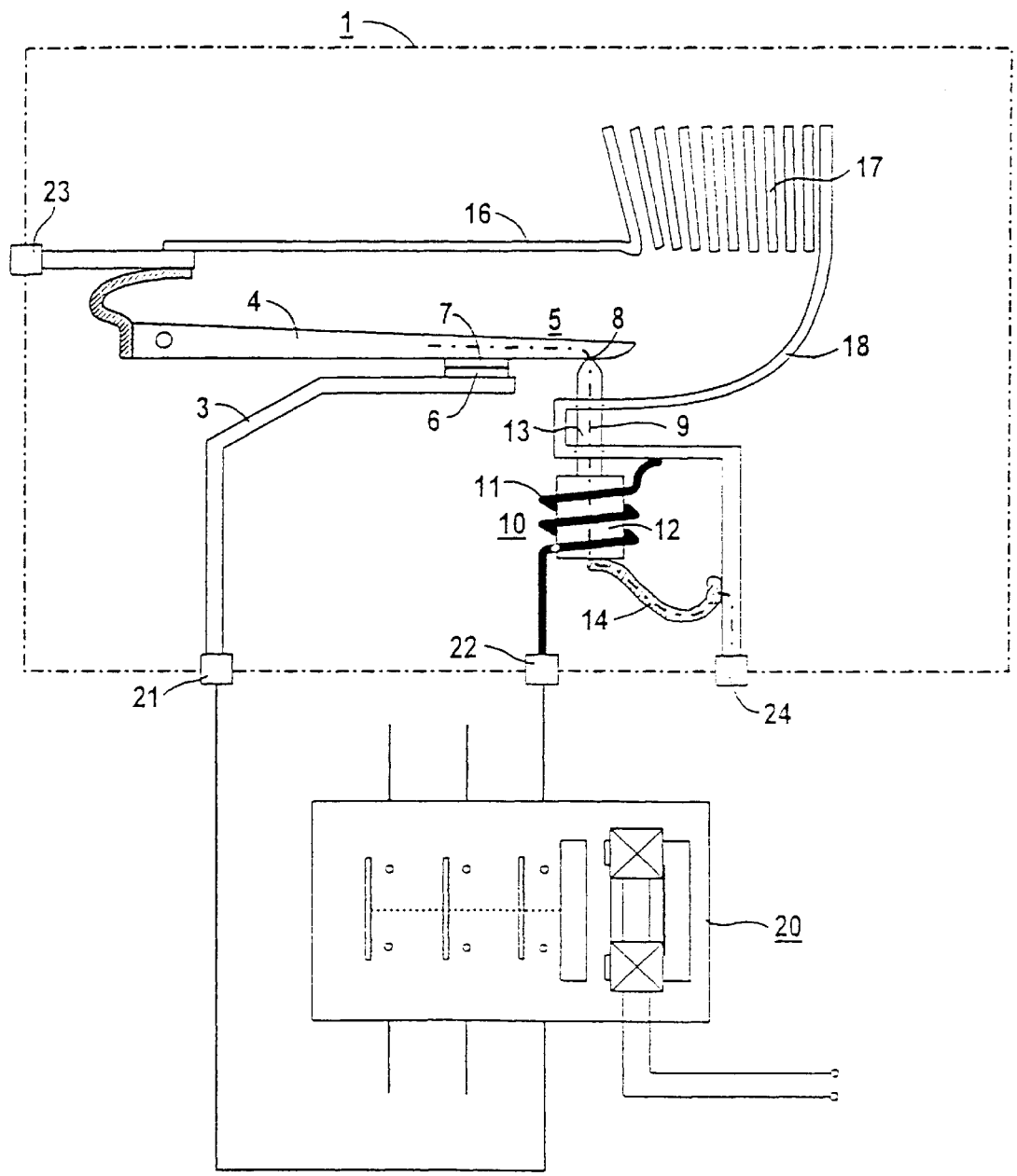
FIG. 1 is a schematic diagram of the major features of the combination of a current-limiting device with a contactor in a first operating phase.

Typical and conventional switch components, such as a switching mechanism and overcurrent release, are not shown in detail in the figures. It is assumed that the contactor is equipped with contact materials which are resistant to welding, so that the contactor contacts are subjected to a certain load from the arc, without being welded. Furthermore, apart from the short-circuit current or forces produced by spring-force energy stores, no external energy, such as electrical auxiliary power or chemical energy, is intended to be used to provide the short-circuit protection.

Referring now to the figures of the drawing in detail, there is seen a current-limiting device 1 for welding protection which comprises the combination of a current-limiting switch with a bridging mechanism and a contactor 20 with a magnetic drive. The bridging mechanism contains a first bridging current path 9 with a bridging contact 8, which is switched on by a magnetic release 10, and a second bridging current path 19 which is switched on by the switching arc 25. Both types of bridging, that is to say contact-bridging or bridging via a switching arc, are already known in the prior art. In this specially detailed combination, they provide the novel device for short-circuit protection. In particular, the novel combination is provided for its consequence of its bridging function when the bridging contact reopens, wherein the magnetic release produces the switching arc which maintains the bridging until the arc is extinguished.

The current-limiting mechanism 1 includes, as is known in the art, a contact configuration 5 comprising a fixed contact 6 and a movable or moving contact 7. The two contacts are fitted to the respective corresponding contact supports 3 and 4.

The contact support 4 for the movable contact 7 is configured to project beyond the actual contact configuration 5 and thus provides a part of a bridging contact 8. A magnetic release 10 comprising a coil 11, armature 12, striker pin 13 and flexible braid 14 is provided, which forms the other part of the bridging contact 8 and acts on the movable contact support 4. Furthermore, the movable contact 7 is connected to a movable contact running rail or movable arc runner 16 and to an arcing chamber 17, comprising a large number of arcing plates, which, for its part, in turn makes contact with the bridging contact via a fixed contact running rail or fixed contact arc runner 18.

Thus, in this context, the term bridging contact 8 means the contact pair which is formed from an end part of the contact support 4 and from the striker pin 13. The striker pin 13 and the armature 12 of the magnetic release 10 may contain a copper core in order to improve the electrical conductivity.

The current-limiting mechanism 1, which is represented as a current-limiting switch, has four main current connections 21 to 24 for each main current path. Two of these main current connections, that is to say the connections 23 and 24, are used for the conventional switchgear connection to the electrical mains system, that is to say one current connection for each main current path is located on the feed side, and one on the load side of the switching device.

The associated main current path of the contactor 20 is connected to the two other main current connections 21 and 22. The current path of a main current path thus passes from the feed side through a part of the current-limiting switching device to the contactor 20 and from there onward through the remaining part of the switching device 1 to the load side. In normal operation, the switching function of the contactor 20 switches the overall main current path on or off.

Figure 2:
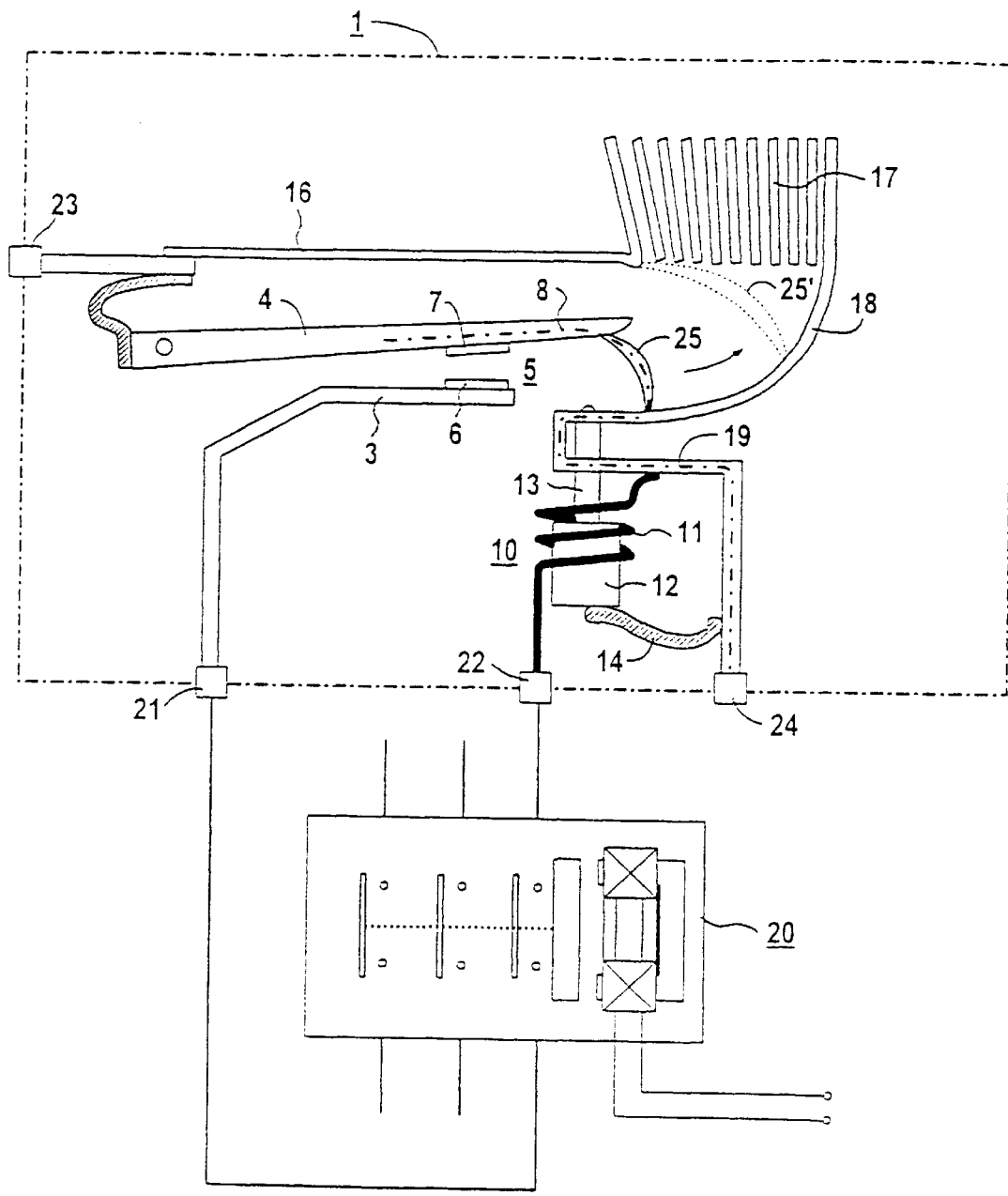
FIG. 2 is a similar view of the current-limiting mechanism illustrated in FIG. 1 in a second operating phase.

If the current-limiting switch 1 is switched off during normal operation, for example for maintenance purposes on the contactor or in the load circuit, then the switching arc 25 commutates, as shown in FIG. 2, from the opened contacts 6, 7 onto the associated running rails 16, 18 and, when it runs into the arcing chamber 17, interrupts, in a conventional manner, the circuit between the feed side with the movable contact 7 and the load side. The load side, and the contactor 20 as well, are then electrically separated from the feed side.

In the event of an overcurrent or short-circuit, the magnetic excitation of the release 10 by the electric current is sufficiently great that the switching mechanism, which is normally present but is not illustrated, trips without any delay, and the bridging contact 8 is closed. The bridging current path which is now formed passes via the arm 4 of the movable contact 7, the bridging contact 8 with the magnet armature and a flexible connecting line 14 to the load connection 24 of the contactor 20. Since this current path may carry electric current for only a short time—that is to say in the millisecond range—and must not carry any current during normal operation, the flexible electrical conductor can be monitored, for example by a bimetallic release, which operates the switching mechanism in the event of a fault. Alternative, non-electronic monitoring devices are current transformer holding magnetic releases, snap-action disks, etc. Since, when the main current path is bridged with the connections 21 and 22, the current is disconnected not only from the contactor 20 but also from the coil 11 of the magnetic release 10, the armature 12 with the striker pin 13 falls back to its rest position and opens the bridging contact 8. The arc 25 which is formed between the opening bridging contact 8, that is to say between the movable contact support 4 and the striker pin 12, commutates, driven by the magnetic blowing field of the movable contact 7, as an arc 25' onto the fixed contact guide rail 18 and moves, being lengthened in the process and with a consequent rise in the arc voltage, into the arcing chamber 17.

The partial inductance of the main current path which leads from the fixed contact 6 via the contactor 20 and the magnet coil 11 to the load connection results in the electric current in the contactor main current path not decaying abruptly when the bridging contact 8 makes contact, but such that a certain time interval ($t_B$<1 ms) is required for this purpose. In the process, the arc 25 which is formed between the opened contact configuration 5 with the fixed contact 6 and the movable contact 7 of the current-limiting mechanism 1 is moved by the magnetic blowing effect of the current loop comprising the moving contact, arc, fixed contact to the gap between the fixed contact 6 and the fixed contact running rail 18, and is extinguished once the current has decayed (if $½Li^2 \approx ½i^*U_B^*t_B$ and $L \approx 2$ μH, $i \approx 5$ kA, $U_B \approx 20$ V, it follows for the arc duration (=decay time) that $t_B \approx 0.5$ ms).

The functional description of the current-limiting process omits a detailed description of some of the switch components such as the switching mechanism: in a first implementation of the current-limiting mechanism 1, the magnetic release results in the mechanical unlatching of the switching mechanism in addition to switching on the bridging contact and providing the sudden opening movement onto the movable contact. The characteristics of the switching mechanism are designed such that, once the magnet armature of the magnetic release has tripped, this is followed by the mechanical drive of the switching mechanism completely opening the moving contact, and holding it open.

Figure 3:
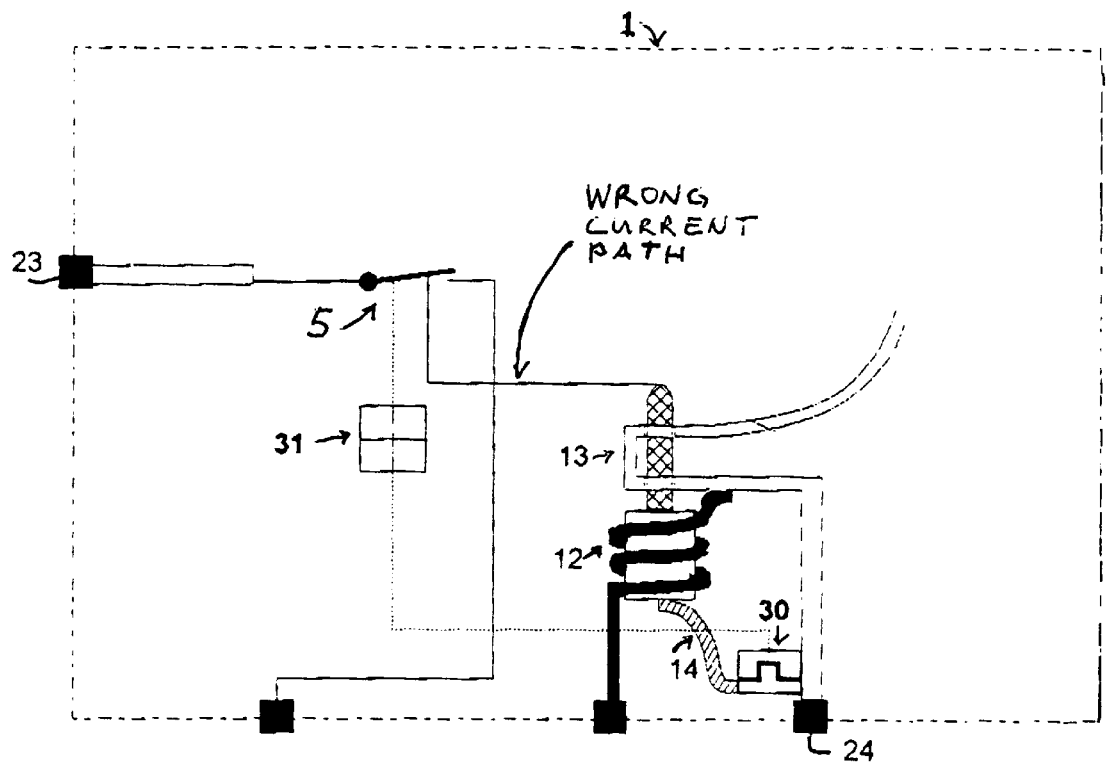
FIG. 3 is a schematic diagram for illustrating the release function of an electro-thermal bimetallic release to control the current of the first bridging contact.

FIG. 3 shows the current control of the flexible current lead 14 by a bimetallic release 30. In this figure a wrong current path connects the movable contact 5 to the electrically conducting striker pin 13, the armature 12 and the current lead 14, which is connected to the connection 24 of the current limiting device 1. If the wrong current path carries the normal rated current totally or at least in partially for a time of several half waves, the bimetallic release 30 trips the striker mechanism 31 of the current limiting device 1. The breaker mechanism 31 therefore moves the movable contact 5 to its open position and disconnects the connections 23 and 24.

In an alternative implementation, the current-limiting device contains a second magnetic release, which is arranged in the main circuit of the current-limiting device and whose response behavior is set such that its sudden opening movement onto the movable contact takes place approximately the same time interval ($\approx 0.5$ to 1 ms) later than the opening movement of the first magnetic release with the bridging contact, and this time interval is greater than or equal to the time for which the bridging contact is switched on.

The electromagnetic protection device described with reference to the figures thus uses proven protection concepts for short-circuit current limiting in low-voltage switching technology, and supplements these concepts by the very-fast bridging, according to the invention, by means of a magnetic release which, functionally, then merges into bridging by means of the switching arc.

The additional technical complexity and the additional costs are minimal, so that the described protection device can be used widely in industrial power systems.

I claim:

1. A device for short-circuit protection of an electromechanical contactor, which comprises:

a current-limiting mechanism connected in series with an electromechanical contactor, said current-limiting mechanism comprising a contact configuration having a fixed contact, a movable contact, and an arcing chamber associated therewith;

said current limiting mechanism defining a first bridging circuit with a bridging contact having a closing position to close said bridging contact and an opening position to open said bridging contact, a second bridging circuit, and arc runners, said bridging contact being opened under a nominal operating condition;

said current-limiting mechanism being configured, in an event of a short circuit, to first close said bridging contact of said first bridging circuit for reducing a current load on the contactor, and to then establish a bridging function with a switching arc and via said second bridging circuit said switching arc being established when said bridging contact of said first bridging circuit is opened, and said switching arc commutates from said bridging contact onto said arc runners and runs into said arcing chamber, for interrupting the short-circuit.

2. The device according to claim 1, wherein said bridging contact includes an electrically conductive striker pin of a magnetic release, being activated by a short circuit current, and said striker pin is pushed against a flashing horn of a contact carrier carrying said movable contact to make an electrical contact on said flashing horn.

3. The device according to claim 2, wherein the contactor is connected to associated connecting terminals electrically connected in parallel with said bridging circuits.

4. The device according to claim 3, wherein said current-limiting mechanism has main contacts electrically connected in parallel with said bridging circuits, and electrically connected in series with the contactor which is connected to the associated connecting terminals.

5. The device according to claim 2, wherein said current-limiting mechanism is configured to conduct a short-circuit current through a magnet coil of the magnetic release until a time at which said bridging contact closes.

6. The device according to claim 5, wherein closing times are defined between 1 and 2 ms.

7. The device according to claim 1, wherein, once contact has been made by said bridging contact, said movable contact and said fixed contact of a main current path of said current-limiting mechanism are disconnected, and the short-circuit current commutates onto a current path defined by said first bridging circuit.

8. The device according to claim 7, which comprises a release magnet armature configured to trip after commutation of the short-circuit current.

9. The device according to claim 8, wherein said current-limiting mechanism is configured to allow the arc to commutate from said bridging contact onto the fixed contact guide rail when the short-circuit current commutates from said first bridging current path onto said second bridging current path.

10. The device according to claim 1, wherein said first bridging circuit defines a bridging current path through said bridging contact carrying electric current only during short-circuit disconnection.

11. The device according to claim 1, which comprises a current-monitoring device in said first bridging circuit for tripping said current-limiting device if an electric current of a predetermined magnitude and time duration is exceeded.

12. The device according to claim 11, wherein said current-monitoring device is an electro-thermal bimetallic release.

13. The device according to claim 11, wherein said current limiting mechanism is configured to protect the contacts of the contactor from being welded by a short-circuit load.

14. In combination with an electromechanical contactor, a current-limiting device connected in series with the electromechanical contactor for protecting the electromechanical contactor against short-circuit currents, the device comprising:

a contact configuration having a fixed contact, a movable contact, and an arcing chamber associated therewith;

a first bridging circuit with a bridging contact having a closing position to close said bridging contact and an opening position to open said bridging contact, a second bridging circuit, and associated arc runners, said bridging contact being opened under a nominal operating condition;

whereby, upon detecting a short-circuit current, said bridging contact of said first bridging circuit is closed for reducing a current load on the contactor, and then a bridging function of said first bridging circuit is transferred with a switching arc to said second bridging circuit, and whereby said switching arc is established when said bridging contact of said first bridging circuit is opened, and said switching arc is caused to commutate onto said arc runners and into said arcing chamber, whereupon the short-circuit is interrupted.

* * * * *